(12) United States Patent
Dorn et al.

(10) Patent No.: US 9,482,118 B2
(45) Date of Patent: Nov. 1, 2016

(54) TAPPET

(71) Applicant: Schaeffler Technologies AG & Co. KG, Herzogenaurach (DE)

(72) Inventors: Stefan Dorn, Hollfeld (DE); Norbert Geyer, Hochstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/761,416

(22) PCT Filed: Jan. 20, 2014

(86) PCT No.: PCT/DE2014/200009
§ 371 (c)(1),
(2) Date: Jul. 16, 2015

(87) PCT Pub. No.: WO2014/139521
PCT Pub. Date: Sep. 18, 2014

(65) Prior Publication Data
US 2015/0361836 A1    Dec. 17, 2015

(30) Foreign Application Priority Data
Mar. 12, 2013  (DE) .................. 10 2013 204 178

(51) Int. Cl.
F01L 1/14 (2006.01)
F02M 59/10 (2006.01)
F16H 53/06 (2006.01)

(52) U.S. Cl.
CPC ............. *F01L 1/14* (2013.01); *F02M 59/102* (2013.01); *F16H 53/06* (2013.01); *F01L 2105/00* (2013.01); *Y10T 74/2107* (2015.01)

(58) Field of Classification Search
CPC .... F01L 1/14; F01L 2105/00; F02M 59/102; F16H 53/06; Y10T 74/2107
USPC .................................. 123/90.48, 90.55, 90.5
See application file for complete search history.

(56) References Cited

U.S. PATENT DOCUMENTS

| 8,875,676 B2 | 11/2014 | Geyer et al. |
| 2008/0190237 A1 | 8/2008 | Radinger et al. |
| 2011/0088506 A1 | 4/2011 | Oishi et al. |
| 2012/0152187 A1 | 6/2012 | Cornett et al. |

FOREIGN PATENT DOCUMENTS

| CN | 101737109 | 6/2010 |
| DE | 102008059004 | 5/2010 |
| DE | 102010022318 | 12/2011 |

*Primary Examiner* — Ching Chang
(74) *Attorney, Agent, or Firm* — Volpe and Koenig, P.C.

(57) ABSTRACT

A tappet (1) having a tube-like housing (2), which in the region of one of the end faces (3) thereof receives a roller (5) running on a pin (4) and serving for contact with a periodic stroke generator. The pin (4) is mounted via the ends (6) thereof in a flat (8) that is indented from an outer surface (7) of the housing, wherein in the housing (2), axially beneath the roller (5), means (9) are provided for an at least indirect bearing of a tappet follower member. The housing (2) is formed of an extruded profile having profiling on the inner surface (10) of the housing (2), wherein, viewed in a circumferential direction of the housing (2), at least twothick-wall profile segments and two thin-wall profile segments (11, 12) are present. The thick-wall profile segments lie diametrically opposite each other and the thin-wall profile segments lie diametrically opposite each other, and the flat portions (8) are located in the thick-wall profiled segments (11).

7 Claims, 1 Drawing Sheet

TAPPET

BACKGROUND

The invention relates to a tappet with a tube-like housing that holds, in the area of its ring end faces, a roller that is used for contact with a periodic lift generator and runs on a pin, wherein this pin is supported by its ends in a flat area indented from an outer lateral surface of the housing, wherein, in the housing, means for at least indirect contact of a tappet follower element are provided axially underneath the roller.

A tappet according to the class, here, for a high-pressure fuel pump of an internal combustion engine, is disclosed in DE 10 2010 022 318 A1. Its tube-like housing is either deep-drawn or extrusion-pressed. It has an essentially constant wall thickness. The housing is over-dimensioned in a few wall segments and thus its construction is too heavy. This has a negative effect on the mass moment of inertia of the entire tappet. In addition, because the previously described production processes limit the height of the tappet, keyword "drawing depth", which can result in guiding or sealing problems, for example, on its outer lateral surface. Using a cutting process to form the tappet is too expensive here.

SUMMARY

The object of the invention is to create a tappet without the mentioned disadvantages. In particular, an easily manufacturable tappet is to be created that simultaneously has a lightweight construction and is developed for the high loads of modern drives.

According to the invention, this object is achieved in that the housing is made from an extruded profile part that is profiled on its inner lateral surface, wherein, viewed in the circumferential direction of the housing, at least two thick-wall and two thin-wall profile segments are provided that are diametrically opposed to each other and wherein the flat areas are in the thick-wall profile segments.

This produces a tappet without the disadvantages described above. The housing of the tappet can separated from a half-finished part, such as an inner-profiled tube as a tubular part in large-scale production. The tube itself is obtained, e.g., through extrusion pressing or drawing or reaming or, if necessary, through deep drawing, etc. The separating process can be realized by cutting, sawing, cutoff grinding, rolling, punching, or a similar process.

Due to the formation of the housing from an inner profiled tubular part, now any height can be achieved. If necessary, the housing could also be profiled on the outer lateral surface, as long as the surrounding construction allows it. This measure can be realized alone or in combination with a profiling of the inner lateral surface of the housing. A sliding surface is also conceivable and provided instead of the roller.

According to the invention, a thin-wall profile segment now follows a thick-wall profile segment on the inner lateral surface of the housing. The housing is made thicker only at the functionally relevant circumferential areas. Thus, the tappet has a lightweight construction or it can be made larger with the same mass.

As further proposed, the housing on the outer lateral surface should be smooth and cylindrical up to the flat areas. This simplifies its handling and sufficient sealing surface is available for installation.

Another subordinate claim refers to easily constructed means in the tappet for contacting a tappet follower element. Thus, a crossbeam or a plate can be used that crosses the tappet interior on its bottom side and contacts the bottom sides of the flat areas and acts as a direct contact for the tappet follower element. Additional contacting means extending from the inner lateral surface of the housing or attached there at a later time can be eliminated.

For the implementation of the invention, various geometries of the wall profile segments on the inner lateral surface of the housing are proposed. Also at least one wall profile segment can be assembled in cross section from several radii. In addition, a profile deviating from the arc shape can be favorable, e.g., a chord-like (straight) shape.

Finally, various possible uses of the tappet are listed. For example, this can be used in a pump, such as a high pressure fuel pump of a quality or quantity-regulated internal combustion engine. It can also be used as a pocket-like tappet in an OHV valve train of an internal combustion engine. Alternatively, use in a drive of a compressor or hydraulic motor is also provided.

BRIEF DESCRIPTION OF THE DRAWING

The invention is disclosed from the drawing.

DETAILED DESCRIPTION OF THE PREFERRED EMBODIMENT

Figure 1:
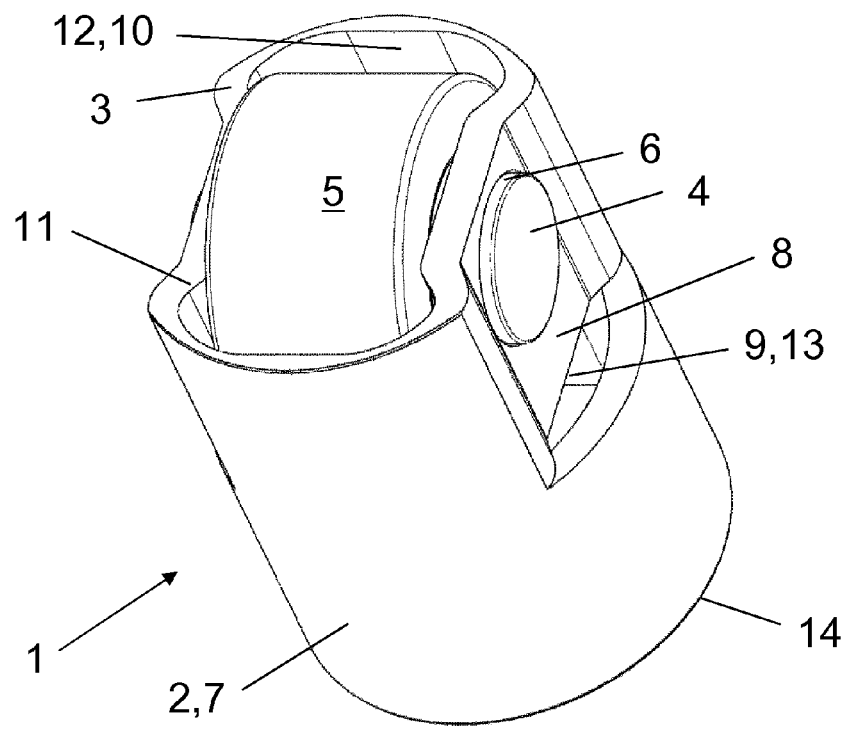
FIG. 1 shows a perspective view of the tappet.

A tappet 1 is shown in FIG. 1. This is provided for use in a high pressure fuel pump of an internal combustion engine.

The tappet 1 has a tubular housing 2. This holds a roller 5 used for a cam contact in the area of its upper ring end face 3. This roller is supported on a pin 4 that is supported by means of each of its ends 6 in a flat area 8 indented integrally from the outer lateral surface 7 of the housing 2.

Axially underneath the roller 5 there are means 9 for an indirect contact of a pump piston as a tappet following element in the housing 2. The pump piston itself is shown, e.g., in DE 10 2010 022 318 A1, applied to a bottom side of a bridge part, wherein this bridge part can be supported on lower end faces 13 of the flat areas 8 running on one side of another ring end face 14 of the housing 2. The lower end faces 13 of the flat area 8 can thus act as this means 9.

The housing 2 of the tappet 1 is formed of an extruded profile part profiled on its inner lateral surface 10. This profile part is separated from an inner profiled tube as a semi-finished part. It can be seen that the housing 2 has two thick wall and two thin-wall profile segments 11, 12 in its cross section. Identical profile segments lie opposite each other. The indented flat areas 8 for supporting the pin 4 are in the thick-wall profile segments 11.

Figure 2:
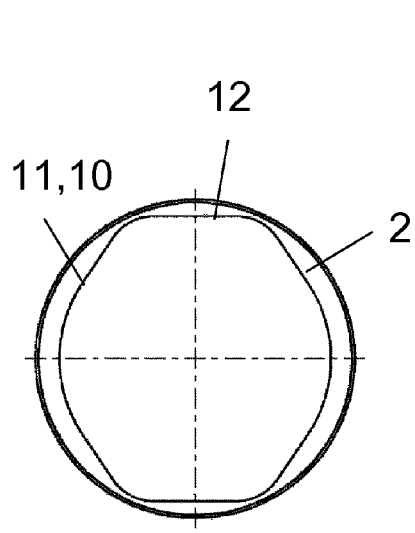
FIG. 2 shows a cross section through the housing of the tappet.
Figure 3:
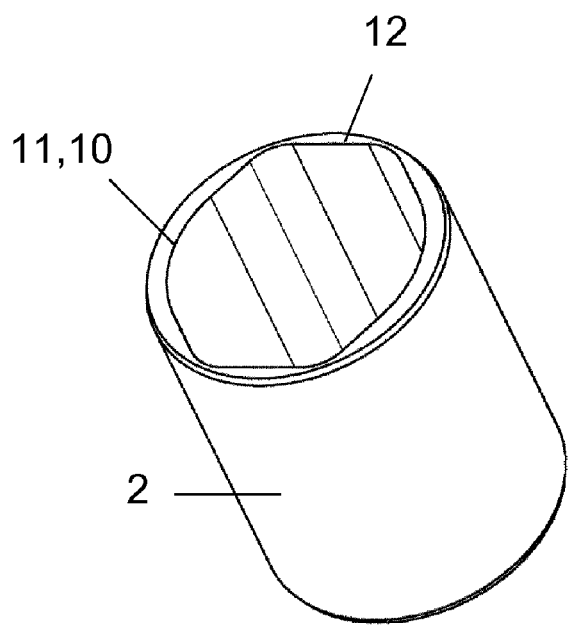
FIG. 3 shows the housing of the tappet in a perspective view before the flat areas are formed.

From FIGS. 2, 3, the housing 2 can be seen, but still without indented flat areas 8. It can be seen that the wall profile segments 11, 12 have the same thickness over the length of the housing 2. At the same time, the outer lateral surface 7 of the housing 2 is smooth and cylindrical.

As can be best seen in FIG. 2, the thick-wall profile segments 11 on the inner lateral surface 10 of the housing 2 are assembled from multiple radii. In contrast, the thin-wall profiles 12 have a chord-like profile.

LIST OF REFERENCE NUMBERS

1) Tappet
2) Housing
3) (Upper) ring end face
4) Pin
5) Roller
6) End
7) Outer lateral surface
8) Flat
9) Means for contact
10) Inner lateral surface
11) Thick wall profile segment
12) Thin wall profile segment
13) Lower end face
14) (Lower) ring end face

The invention claimed is:

1. A tappet comprising a tubular housing that holds, in an area of a ring end face thereof, a roller that is supported on a pin, said pin is supported at ends thereof in flat areas indented from an outer lateral surface of the tubular housing, wherein, in the tubular housing, a bridge part or beam for an at least indirect contact of a tappet follower element is provided axially underneath the roller, the tubular housing is made from an extruded profile piece profiled on an inner lateral surface thereof, and viewed in a circumferential direction of the tubular housing, at least two thick wall and two thin wall profile segments are provided that are diametrically opposed to each other and the flat areas are located in the thick wall profile segments, and the tubular housing defines a clear opening between the at least two thick wall and two thin wall profile segments viewed in an axial direction.

2. The tappet according to claim 1, wherein the at least two thick wall and two thin wall profile segments have an essentially constant thickness viewed in the axial direction of the tappet and up to the flat areas in the thick wall profile segments.

3. The tappet according to claim 1, wherein the outer the outer lateral surface of the tubular housing is smooth and cylindrical up to a section of the flat areas.

4. The tappet according to claim 1, lower end faces of the flat areas support the bridge part or beam projecting through the tubular housing used for direct contact of the tappet follower element.

5. The tappet according to claim 1, wherein at least one of the at least two thick wall and two thin wall profile segments is assembled from several radii on the inner lateral surface of the tubular housing.

6. The tappet according to claim 1, wherein at least one of the at least two thick wall and two thin wall profile segments has a chord-shaped profile on the inner lateral surface of the tubular housing.

7. The tappet according to claim 1, wherein the tappet is provided for use either a) in or for a pump, b) in a valve train of an internal combustion engine, or c) in a drive of a compressor or hydraulic motor.

* * * * *